(12) United States Patent
Delamarche et al.

(10) Patent No.: US 9,168,521 B2
(45) Date of Patent: Oct. 27, 2015

(54) MICROFLUIDIC DEVICE WITH DEFORMABLE VALVE

(71) Applicants: International Business Machines Corporation, Armonk, NY (US); Coris BioConcept, Gembloux (BE)

(72) Inventors: Emmanuel Delamarche, Rueschlikon (CH); Martina Hitzbleck, Rueschlikon (CH); Laetitia C. Avrain, Brussels (BE); Thierry C. Laurent, Wavre (BE); Pascal Y. Mertens, Gesves (BE); Valerie Smekens, Namur (BE)

(73) Assignees: International Business Machines Corporation, Armonk, NY (US); CORIS BIOCONCEPT (BE)

( * ) Notice: Subject to any disclaimer, the term of this patent is extended or adjusted under 35 U.S.C. 154(b) by 0 days.

(21) Appl. No.: 13/676,910

(22) Filed: Nov. 14, 2012

(65) Prior Publication Data

US 2013/0121893 A1  May 16, 2013

(30) Foreign Application Priority Data

Nov. 16, 2011  (EP) .................................. 11189421

(51) Int. Cl.
*F16K 7/14*  (2006.01)
*F16K 7/17*  (2006.01)
(Continued)

(52) U.S. Cl.
CPC ............. *B01L 3/00* (2013.01); *B01L 3/502738* (2013.01); *B01L 3/502746* (2013.01);
(Continued)

(58) Field of Classification Search
CPC .................................................. F16K 99/0026

USPC ........................ 422/68.1, 502–507, 417, 537; 137/70–71, 151
See application file for complete search history.

(56) References Cited

U.S. PATENT DOCUMENTS 7,412,990 B2  8/2008  Chung et al.
7,622,081 B2  11/2009  Chou et al.
(Continued)

FOREIGN PATENT DOCUMENTS

CN  101354030 A  1/2009
CN  101511408 A  8/2009
(Continued)

OTHER PUBLICATIONS

International Search Report and Written Opinion; International Application No. PCT/IB2012/055643; International Filing Date: Oct. 17, 2012; Date of Mailing: Mar. 12, 2013; pp. 1-10.
(Continued)

*Primary Examiner* — Jennifer Wecker
(74) *Attorney, Agent, or Firm* — Cantor Colburn LLP

(57) ABSTRACT

A microfluidic device includes a first microchannel, a second microchannel, and a valve comprising at least an input port and an output port, the ports respectively connected to the first microchannel and the second microchannel, the valve designed to control a flow of a liquid along a flow direction (z) defined by the ports; wherein the valve further comprises one or more walls joining the ports and defining a hollow chamber that is wider than each of the microchannels in a direction perpendicular to the flow direction, the walls at least partly deformable along a deformation direction (−y) intersecting the flow direction, such that the walls can be given at least a first deformation state and a second deformation state, such that the liquid can be pulled along the flow direction substantially more in the second deformation state than in the first deformation state.

25 Claims, 5 Drawing Sheets

(51) Int. Cl.
  *B81B 3/00* (2006.01)
  *B01L 3/00* (2006.01)
  *F16K 99/00* (2006.01)
  *B01L 7/00* (2006.01)

(52) U.S. Cl.
  CPC ........ *F16K 99/0017* (2013.01); *F16K 99/0026* (2013.01); *B01L 7/52* (2013.01); *B01L 2200/0684* (2013.01); *B01L 2300/0816* (2013.01); *B01L 2300/0864* (2013.01); *B01L 2300/14* (2013.01); *B01L 2400/0406* (2013.01); *B01L 2400/0481* (2013.01); *B01L 2400/0487* (2013.01); *B01L 2400/0655* (2013.01); *B01L 2400/0688* (2013.01); *B01L 2400/082* (2013.01); *B01L 2400/086* (2013.01); *F16K 99/0001* (2013.01); *F16K 99/0015* (2013.01); *F16K 2099/008* (2013.01); *F16K 2099/0084* (2013.01)

(56) References Cited

U.S. PATENT DOCUMENTS

| | | | | |
|---|---|---|---|---|
| 7,923,140 | B2 | | 4/2011 | Schumm, Jr. |
| 8,002,933 | B2 | | 8/2011 | Unger et al. |
| 2004/0265180 | A1 | * | 12/2004 | Cox et al. ................ 422/99 |
| 2008/0003145 | A1 | * | 1/2008 | Nurse et al. ............... 422/99 |
| 2008/0003572 | A1 | * | 1/2008 | Delamarche et al. ......... 435/6 |
| 2008/0241844 | A1 | * | 10/2008 | Kellogg ................... 435/6 |
| 2009/0087901 | A1 | * | 4/2009 | Noetzel et al. ........... 435/287.2 |
| 2010/0165784 | A1 | * | 7/2010 | Jovanovich et al. ....... 366/163.2 |
| 2011/0036431 | A1 | * | 2/2011 | Lee ..................... 137/828 |

FOREIGN PATENT DOCUMENTS

| | | | |
|---|---|---|---|
| JP | 2005299597 | A | 10/2005 |
| JP | 2006167719 | A | 6/2006 |
| JP | 2010107051 | A * | 5/2010 |
| JP | 2011052821 | A | 3/2011 |
| WO | 2008105308 | A1 | 9/2008 |
| WO | 2011062471 | A2 | 5/2011 |

OTHER PUBLICATIONS

Robin Hui Liu, et al., "Self-Contained, Fully Integrated Biochip for Sample Preparation, Polymerase Chain Reaction Amplification, and DNA Microarray Detection," Anal. Chem. Articles, 76, pp. 1824-1831, 2004.

Chong H. Ahn, et al.,"Disposable Smart Lab on a Chip for Point-of-Care Clinical Diagnostics," Invited Papers, Proceedings of the IEEE, vol. 92, No. 1, pp. 1-20, Jan. 2004.

James P. Brody, et al., "Biotechnology at Low Reynolds Numbers," Biophysical Journal, vol. 71, pp. 3430-3441, Dec. 1996.

Paul J. A. Kenis, et al., "Microfabrication Inside Capillaries Using Multiphase Laminar Flow Patterning," Science AAAS, vol. 285, pp. 1-4, Jul. 1999.

James B. Knight, et al.,"Hydrodynamic Focusing on a Silicon Chip: Mixing Nanoliters in Microseconds," Physical Review Letters, vol. 80, No. 17, pp. 1-4, Apr. 1998.

Todd M. Squires, et al., "Microfluidics: Fluid Physics at the Nanoliter Scale," Reviews of Modern Physics, vol. 77, pp. 1-50, Jul. 2005.

Jim V. Zoval, et al.,"Centrifuge-Based Fluidic Platforms," Invited Papers, Proceedings of the IEEE, vol. 92, No. 1, pp. 1-14, Jan. 2004.

* cited by examiner

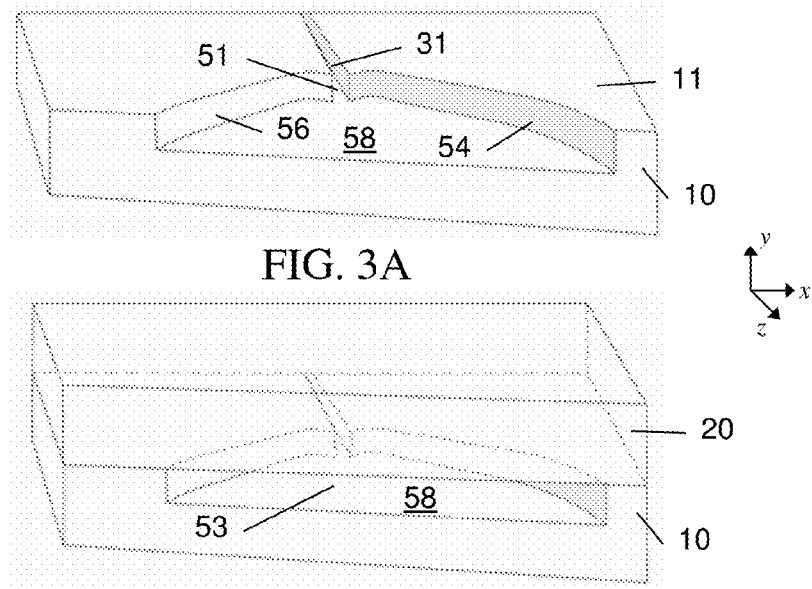
FIG. 3A
FIG. 3B
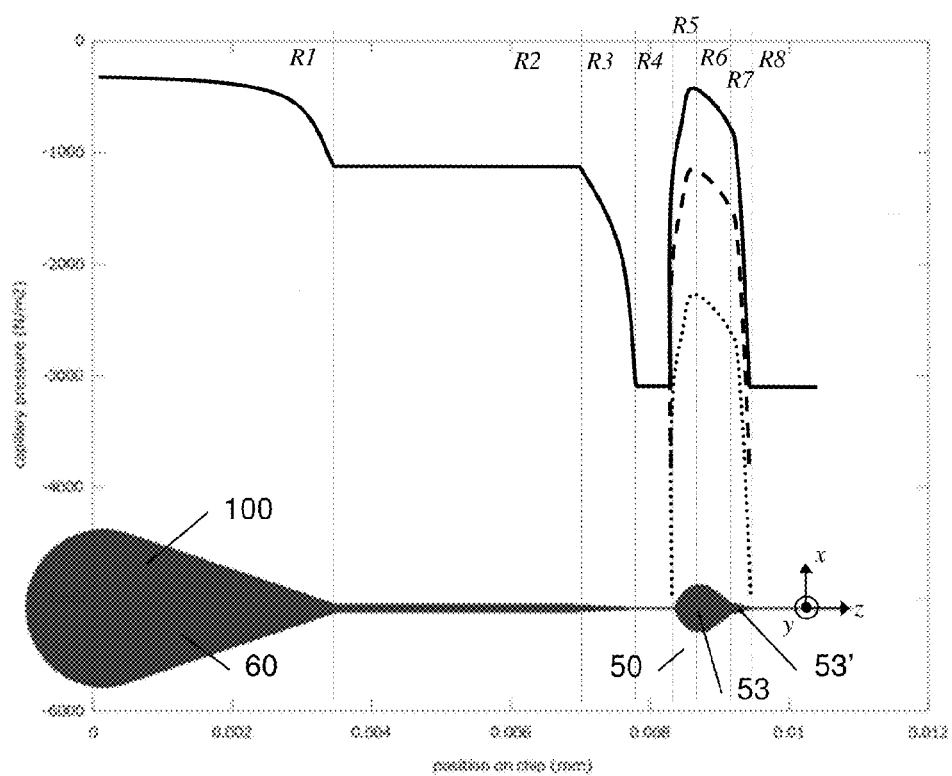
FIG. 4

FIG. 5A  FIG. 5B  FIG. 5C
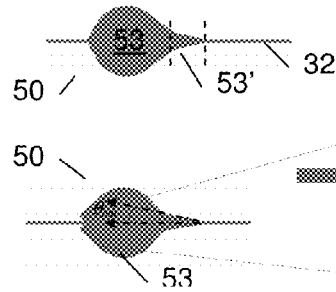
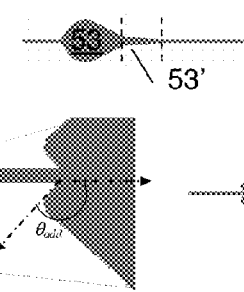
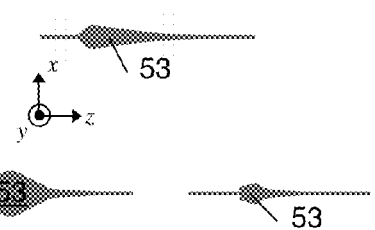
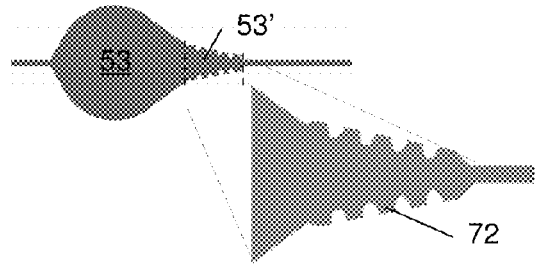
FIG. 6A  FIG. 6B  FIG. 6C  FIG. 6D
FIG. 7A  FIG. 7B  FIG. 7C
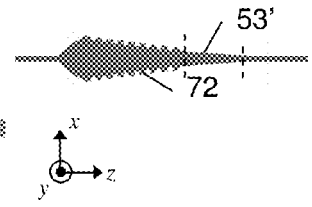
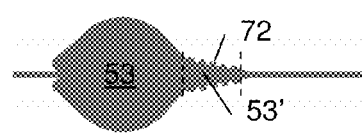
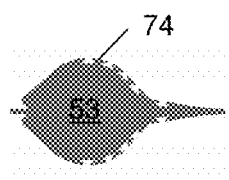
FIG. 8A  FIG. 8B

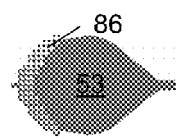 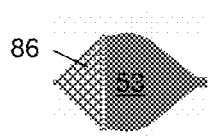 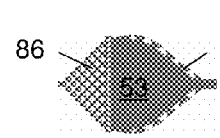 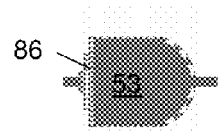
FIG. 9A       FIG. 9B       FIG. 9C       FIG. 9D
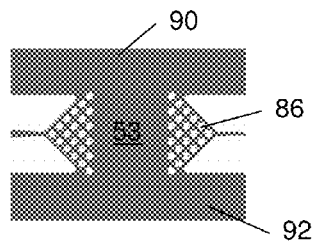 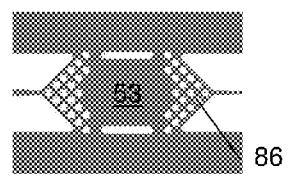 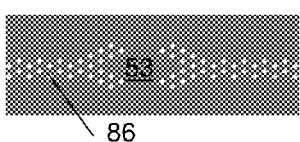
FIG. 10A      FIG. 10B      FIG. 10C
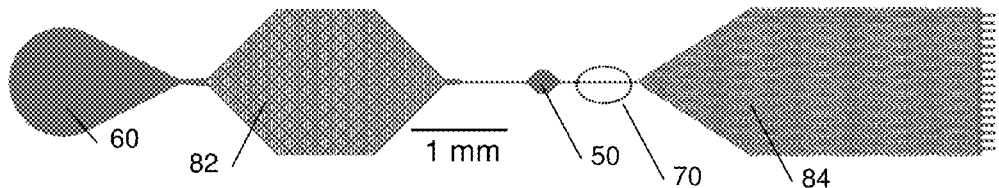
FIG. 11

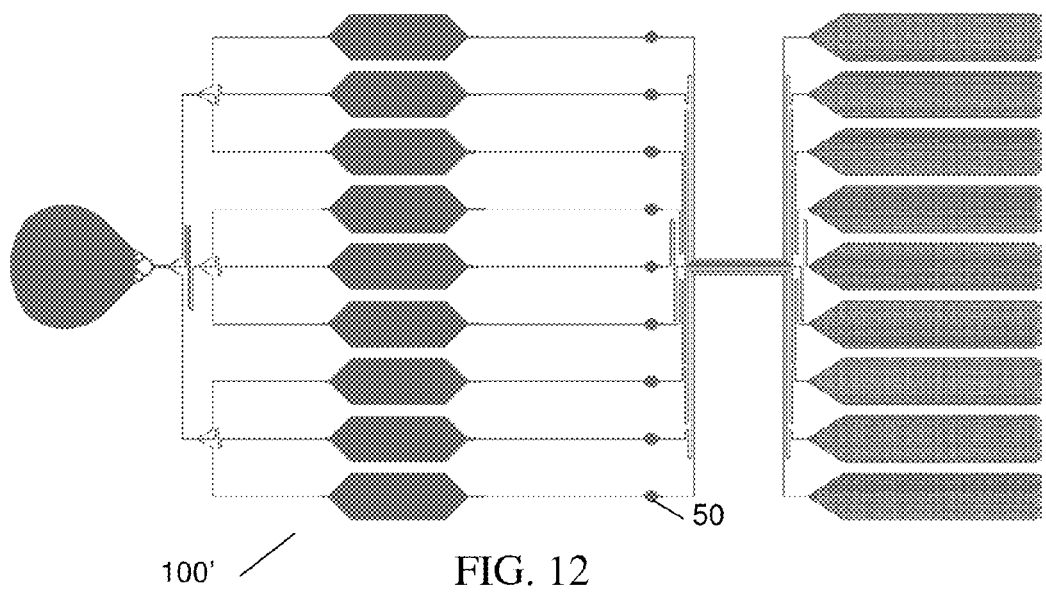
100' FIG. 12
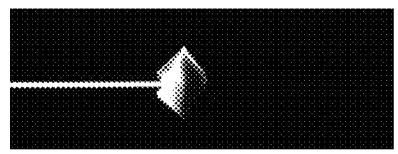
FIG. 13A
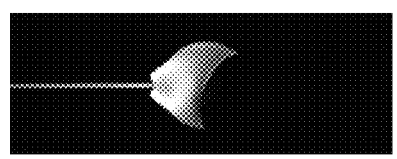
FIG. 13B
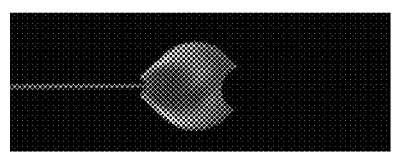
FIG. 13C
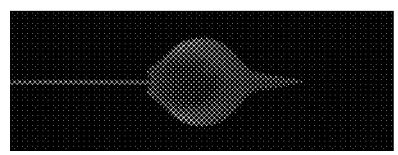
FIG. 13D

MICROFLUIDIC DEVICE WITH DEFORMABLE VALVE

PRIORITY

This application claims priority to European Patent Application No.: 11189421.8, filed Nov. 16, 2011, and all the benefits accruing therefrom under 35 U.S.C. §119, the contents of which in its entirety are herein incorporated by reference.

BACKGROUND

The invention relates in general to the field of microfluidic devices and methods of fabrication and operation thereof. In particular, it is directed to microfluidic devices equipped with microvalves.

Microfluidics generally refers to microfabricated devices, which are used for pumping, sampling, mixing, analyzing and dosing liquids. Prominent features thereof originate from the peculiar behavior that liquids exhibit at the micrometer length scale (see, e.g., Brody, J. P., Yager, P., Goldstein, R. E. and Austin, R. H., 1996 Biotechnology at low Reynolds Numbers, *Biophys. J.* 71, 3430-3441, and Knight, J. B., Vishwanath, A., Brody, J. P. and Austin, R. H., 1998 Hydrodynamic Focusing on a Silicon Chip: Mixing Nanoliter in Microseconds, *Phys. Rev. Lett.* 80, 3863-3866). Flow of liquids in microfluidics is typically laminar. Volumes well below one nanoliter (nL) can be reached by fabricating structures with lateral dimensions in the micrometer range. Reactions that are limited at large scales (by diffusion of reactants) can be accelerated (see Squires, T. M. and Quake, S. R., 2005 Microfluidics: Fluid Physics at the Nanoliter Scale, *Rev. Mod. Phys.* 77, 977-1026). Finally, parallel streams of liquids can possibly be accurately and reproducibility controlled, allowing for chemical reactions and gradients to be made at liquid/liquid and liquid/solid interfaces (Kenis, P. J. A., Ismagilov, R. F. and Whitesides, G. M., 1999 Microfabrication Inside Capillaries Using Multiphase Laminar Flow Patterning, *Science* 285, 83-85). Microfluidics are accordingly used for various applications in life sciences.

Many microfluidic devices have user chip interfaces and closed flowpaths. Closed flowpaths facilitate the integration of functional elements (e.g., heaters, mixers, pumps, UV detector, valves, etc.) into one device while minimizing problems related to leaks and evaporation.

The analysis of liquid samples often requires a series of steps (e.g., filtration, dissolution of reagents, heating, washing, reading of signal, etc.). For portable diagnostic devices, this requires accurate flow control using various pumping and valve principles. It is usually a challenge to obtain valves that are simple, inexpensive to fabricate and easy to operate.

Two categories of valves for microfluidic devices (or "microvalves") can generally be identified: (i) the active valves and (ii) the passive valves.

Active microvalves usually have increased fabrication complexity, are expensive to fabricate, and need power for actuation. They further need external peripheral and also need power to stay in "on" or "off" state. An example is the "abrupt junction passive microvalve". Such a microvalve requires active pumping to pump aqueous liquids inside hydrophobic structures, where they can be pinned at constriction. Increasing the pumping pressure results in pushing liquid through the valve. As it may be realized, such a solution is however not compatible with capillary-driven microfluidics. It further requires active pumping and actuation, i.e., additional peripherals. In addition, liquids tend to break in larger volume before a constriction.

Next, passive microvalves usually lack interactivity (i.e. they impose predefined opening or closing conditions), require complex fabrication of integration of chemicals. In addition, passive valves that are initially in closed state usually have problems with venting of air.

The following references address various types of microvalves that have been developed so far:

Liu, et al. Anal. Chem. 2004, 76, 1824-1831.
Ahn, et al. Proc. of the IEEE, Vol. 92, No. 1, January 2004, pp. 154-173.
Zoval, et al. Proc. of the IEEE, Vol. 92, No. 1, January 2004, pp. 140-153.

SUMMARY

In one embodiment, a microfluidic device includes a first microchannel, a second microchannel, and a valve comprising at least an input port and an output port, the ports respectively connected to the first microchannel and the second microchannel, the valve designed to control a flow of a liquid along a flow direction (z) defined by the ports; wherein the valve further comprises one or more walls joining the ports and defining a hollow chamber that is wider than each of the microchannels in a direction perpendicular to the flow direction, the walls at least partly deformable along a deformation direction (−y) intersecting the flow direction, such that the walls can be given at least a first deformation state and a second deformation state, such that the liquid can be pulled along the flow direction substantially more in the second deformation state than in the first deformation state.

In another embodiment, a microfluidic device includes a plurality of sets, each of the sets comprising a first microchannel, a second microchannels and a valve, comprising at least an input port and an output port, the ports respectively connected to the first microchannel and the second microchannel, the valve designed to control a flow of a liquid along a flow direction (z) defined by the ports; wherein the valve further comprises one or more walls joining the ports and defining a hollow chamber that is wider than each of the microchannels in a direction perpendicular to the flow direction, the walls at least partly deformable along a deformation direction (−y) intersecting the flow direction, such that the walls can be given at least a first deformation state and a second deformation state, such that the liquid can be pulled along the flow direction substantially more in the second deformation state than in the first deformation state.

In another embodiment, a method for controlling a liquid flow in a microfluidic device includes filling a first microchannel of the microfluidic device with liquid, the microfluidic device comprising the first microchannel, a second microchannel, and a valve comprising at least an input port and an output port, the ports respectively connected to the first microchannel and the second microchannel, the valve designed to control a flow of a liquid along a flow direction (z) defined by the ports, wherein the valve further comprises one or more walls joining the ports and defining a hollow chamber that is wider than each of the microchannels in a direction perpendicular to the flow direction, the walls at least partly deformable along a deformation direction (−y) intersecting the flow direction, such that the walls can be given at least a first deformation state and a second deformation state, such that the liquid can be pulled along the flow direction substantially more in the second deformation state than in the first deformation state; and deforming the one or more walls at least partly deformable such that liquid is pulled through the hollow chamber from the first microchannel to the second microchannel.

BRIEF DESCRIPTION OF THE SEVERAL VIEWS OF THE DRAWINGS

FIGS. 3A and 3B are partial 3D views (wireframe) of a device, where the microchannels/valve chamber are formed as grooves/depression provided in a layer of the device, according to embodiments;

FIG. 4 is a theoretical model illustrating capillary pressure variations along a device according to embodiments;

FIG. 5A-12 depict various alternate embodiments of a device; and

FIGS. 13A-13D show time sequence fluorescence microscope images, wherein liquid is passing a microvalve, according to applied embodiments.

DETAILED DESCRIPTION

Figure 1A:
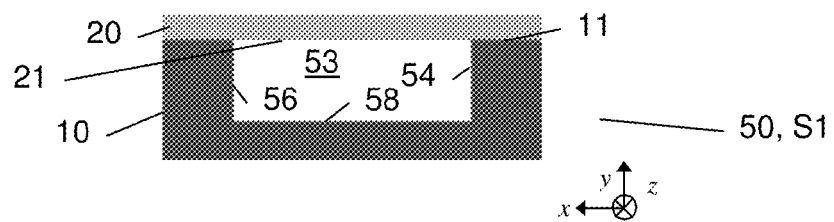
FIGS. 1A and 1B are section views of a device according to embodiments (with section cut through a valve), and illustrating a basic principle of the disclosure.

As an introduction to the following description, it is first that general aspects of the disclosure are directed to microfluidic devices equipped with a valve designed to control a liquid flow. Such a valve has a hollow chamber, typically between two ports, respectively connecting to microchannels. The chamber enlarges a flowpath: it is wider than the microchannels (in a direction perpendicular to the flow direction). Next, the walls delimiting the chamber are at least partly deformable, in a direction perpendicular to a flow direction that is defined by the ports. Typically, a flexible material is used for at least portions of the walls, which can be pressed (e.g., with a rod or stylus), such as to increase the capillary pressure (in absolute terms) and pull the liquid through the valve. Deforming the valve shall therefore determine how a liquid is pulled along the flow direction, by capillarity. This invention relies on a simple external actuation means and the simplicity and efficiency of capillary-driven flow. The present valve further benefits from a simple fabrication; it does not require power to keep the valve in the "on" or "off" state; very small power is required for the deformation of the valve, which can easily be carried out by an operator.

Specific embodiments shall now be described in details, which typically make it possible to achieve no (or negligible) dead volumes and fast switching times. Furthermore, such embodiments do typically not require the use of materials such as, for example: heat sensitive materials (e.g., wax); light sensitive material (light-triggered wetting); sample-responsive material (e.g. pH-sensitive hydrogel); or chemical composition of the sample to convert a hydrophobic barrier into a hydrophilic zone.

In addition, as air is not compressed by filling liquid, there is no need for vents. The fabrication challenge furthermore remains low compared to other known solutions. Indeed, present embodiments do not require providing structures with different depths and tilted sidewalls or complementary matching shapes. They also do not require fabricating and assembling mating parts for occluding the flowpath. Finally, valve mechanisms according to present embodiments are actually not critically sensitive to particles, or dust, etc., in contrast to most of the known valve concepts, which are based on heterogeneous structures where sealing, bonding, etc., is critical.

Referring to FIGS. 1A-2C, a microfluidic device 100 according to embodiments includes a first microchannel 31, a second microchannel 32, and a valve 50 comprising an input port 51 and an output port 52 (only two ports are described, for simplicity). Ports 51, 52 are respectively connected to input/output microchannels 31, 32. The valve is generally designed to control a flow of a liquid L along the flow direction as defined by the ports.

In further detail, this valve has one or more walls 54, 56, 58, 20 joining the ports, such as to define a hollow chamber or cavity 53. The latter is wider than the microchannels in at least one direction, e.g., direction x, which direction is perpendicular to the flow direction z, such as to enlarge the flowpath. At least portions of these walls (e.g., the upper wall 20) are made of a deformable or flexible material. The exact geometry of the walls is not important, as long as they enlarge the flowpath compared to the microchannels and are at least partly deformable, in a direction intersecting the flow direction z (more specifically perpendicularly to direction z). In the depicted example, there are four distinct walls 54, 56, 58, 20 (top, bottom and sides).

However, the hollow chamber could, in variants, be defined by bulb-shaped walls (possibly a single, continuous wall), joining the ports, and at least partly deformable along a deformation direction intersecting the flow direction. In that case, the chamber would be wider than the microchannels in any radial direction (the chamber would typically exhibit cylindrical symmetry with the main axis being that of the flow direction z), such as to enlarge the flowpath perpendicularly to direction z. The walls could be made of a flexible material, deformable along any radial direction (i.e., perpendicularly to direction z). As the skilled reader may appreciate, many other configurations could be defined similarly, e.g., intermediate configurations between the two configurations as defined above.

In all cases, the valve may exhibit two deformation states (or more), notably a first deformation state S1 distinct from a second deformation state S2. As depicted in FIGS. 1A-2C, liquid is pulled along the flow direction substantially more in one of the states (here state S2) than in the other state (S1). Different degrees of flow control can be achieved, up to (in principle) a full on-off switch, as to be discussed later.

Figure 2A:
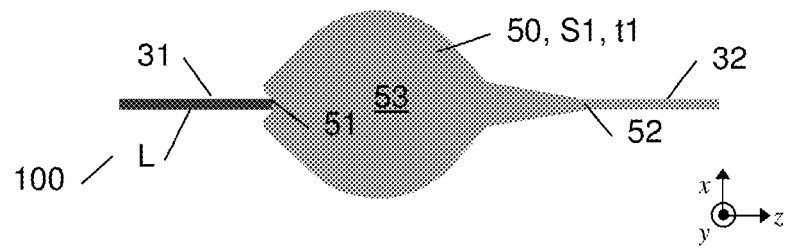
FIGS. 2A-2C are top views of the device of FIGS. 1A and 1B, and illustrate the same principle.
Figure 2B:
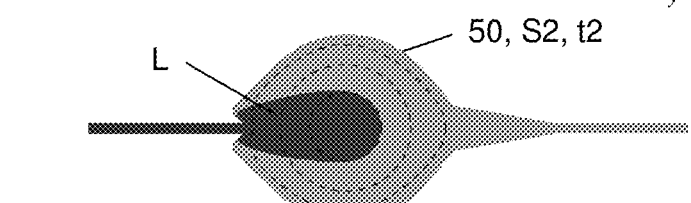
Figure 2C:
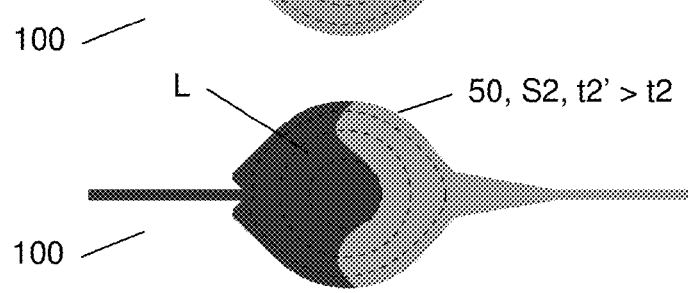

The operation principle of the valve is better described in terms of capillary pressures as experienced by a liquid propagating through the device 100. By convention, an "attractive" capillary pressure is assumed negative, according to thermodynamics standards. The distinct deformation states induce distinct capillary pressures for a liquid L filling the device 100, as illustrated in FIG. 2A-C, which in turn makes it possible to modify the way the liquid L is pulled throughout the chamber 53.

In the following, it may be assumed by way of example that liquid is filled from the left side (i.e., from the first microchannel 31, see FIGS. 2, 4, and 5 to 13), and the second deformation state S2 is a deformed state (substantial stress applied, as in FIG. 1B), while the first state S1 essentially corresponds to a non-deformed state (no specific stress applied, FIG. 1B). The extent of deformations conferred by the two states S1, S2 is such that a first capillary pressure P1 (as induced by state S1, non-deformed) must be substantially larger than capillary pressure P2 as experienced by a liquid when the valve is in the deformation state S2. This shall be quantified later by way of examples.

Figure 1B:
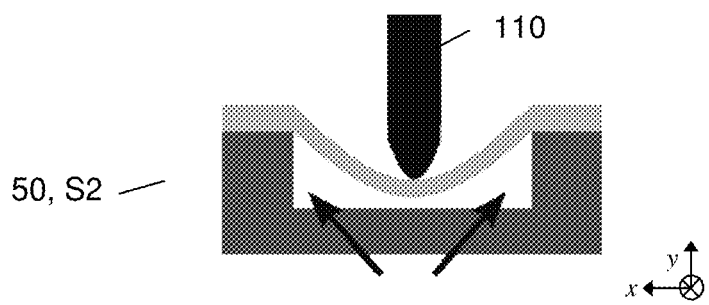

An exemplary device may be operated as follows, with reference to FIGS. 1 and 2. First, as illustrated FIG. 2A (non-deformed state S1, time t1): a liquid L is filled from microchannel 31, where it reaches port 51. There, the liquid slows down or even stops, because of the large capillary pressure P1 induced by non-deformed state S1. The inside of the valve's chamber 53 is so far such as depicted in FIG. 1A. In that respect, the valve is configured such as to enlarge (e.g., abruptly) the wettable flowpath when going from microchannel 31 to chamber 53. This enlargement results in increasing the capillary pressure (or reducing it in absolute terms), at least when the chamber is not deformed, and this, sufficiently to slow down the liquid, or possibly stop it. The precise behavior of the liquid will depend on the nature of the liquid, the precise geometry of the chamber at the level of the input port 51, the chemical surface state, etc., as many parameters that shall discussed in more details below;

Second, as depicted in FIG. 1B (state S2, time t2>t1), the valve is deformed, e.g., pressed at the center towards −y, due to a push rod or the like. As the valve's walls are deformed along deformation axis y, which axis intersects the flow direction z, the local dimension (along y) of the chamber is reduced, which enhances capillary effects. Thus, the valve can be regarded as being more capillary active in one of the states than in the other.

As a result of the deformation (FIG. 2B), capillary pressure drops and liquid is pulled along the flow direction, i.e., at least substantially more in deformed state S2 than in initial state S1. In FIG. 1B, the two arrows point at regions that still exhibit high capillary pressure, even when the chamber is deformed, compared to the center. As a result, liquid propagates first towards the center (time t2), i.e., the most deformed region where capillary pressure is the lowest (negative values are assumed).

Eventually (state S2, time t2'>t2, FIG. 2C), liquid propagates to other regions of the chamber, having higher capillary pressure. Maintaining the deformation allows for the liquid to advance towards port 51, until it reaches the second microchannel 32 (not shown).

More specifically, the walls of the valve are non-permanently deformable, such as to allow for reverting to a non-deformed state. Even more specifically, they are resiliently deformable, to allow for re-using the valve. Yet, for some applications where e.g., single use of valves is expected, the valves' walls need not be non-permanently (or resiliently) deformable. On the contrary, permanently deformable valves may be used to prevent re-using the device (single-use test chip, etc.), e.g., for security reasons. Another possibility would be to rely on a flexible material, yet configured to exhibit a snapping effect, e.g., once deformed, the chamber cannot easily revert to its initial geometry.

In the above described example, it is assumed that the first state is a non-deformed state and the second state a deformed state. However, it will be appreciated that various configurations/scenarios fall under the same principle as described above, i.e., that the liquid be pulled along the flow direction substantially more in one state than in the other. For example, the chamber could be initially deformed (e.g., pressed on the sides to increase the mean height along z) and maintained in this deformed state, such as to be capillary inactive and prevent liquid to flow through the valve. Restoring a non-deformed state of the valve, wherein the valve is capillary active would prompt the liquid to flow through. This actually depends on the deformation direction, vs. the flow direction and the general geometry of the chamber.

With respect to the deformation direction, it has been assumed thus far that this direction had to intersect the flow direction z, i.e., with a non-zero angle. The simplest designs are obtained for configurations where the deformation direction (y) is perpendicular to the flow direction z. In this respect, in the examples of FIGS. 1 and 2, the valve 50 is created by enlarging the wettable flowpath along the x axis i.e., perpendicular to both the flow direction z and the deformation direction y. Here, a characteristic dimension of the chamber 53 along x (e. g., measured in the main plane of the chamber 53) is substantially larger than the characteristic dimension of the microchannels along the same axis x. In this case, deforming the valve essentially along y (actually in the direction −y), allow the liquid to more easily contact both lower and upper walls 58, 11 and propagates towards output port 53, by capillarity. However, deforming the valve along x may in principle allow the same, provided that side walls 54, 56 can be sufficiently deformed to get close enough to each other and allow the liquid to propagate. Thus, it will be understood that the deformation direction must have a component (e.g., along x or y) perpendicular to the flow direction z. This is why the valve (i.e., its walls) must be at least partly deformable along a deformation direction intersecting the flow direction z.

The valve is essentially deformable along y (rather than x), as in the examples of FIGS. 1 and 2, such that the deformation direction y intersects both the flow direction z and the enlargement direction x. This is advantageous in terms of fabrication process, inasmuch as the depths of the microchannels and the chamber can in this case be essentially the same, subject to machining tool precision. This is illustrated in FIGS. 3A and 3B (wireframe pictures), where the microchannels 31, 32 and the chamber 53 are shown to be provided as grooves/depression in a single layer 10. More precisely, each of microchannels 31, 32 (or at least end portions thereof at the level of respective ports 51, 52) are grooves open on the upper surface 11 of the first layer 10. Similarly, the hollow chamber is essentially delimited by a depression 53 open on the upper surface 11. As seen in FIG. 3B, the grooves and depression are closeable by the lower surface of the second layer 20 (i.e., the lower surface 21 in FIG. 1A). Such a design is easily manufactured, owing to the single machining depth necessary here.

Incidentally, it will be noted that not all the walls 54, 56, 58, 20 need be deformable. For example, only the upper wall 20 need be deformable (as illustrated in FIG. 1B). Conversely (or in addition), the wall 54, 56 could be deformable too, or at least portions thereof. Similarly, only the lower wall 58 could be made deformable, etc.

When a two-layer manufacture process is contemplated, then at least one of the layers 10, 20 can be made of a deformable material. Having one of the layers 10, 20 (or both) made of a flexible material is simpler in terms of fabrication steps.

The deformable layer may exhibit a tensile strength between 1 and 60 MPa. It can for example be made of a poly(dimethylsiloxane) elastomer, for which typical tensile strengths vary between 1 and 10 MPa. They can otherwise advantageously be made of a plastic material. One preferred example is a polyolefin copolymer, easier to fabricate in large numbers using mold injection or embossing techniques. Thermoplastic materials are suitable candidates, typically having a tensile strength between 20 and 60 MPa, see e.g., the Polymer Data Handbook, Oxford University Press, 1999. Another example of a suitable material is Sylgard 184™ poly(dimethylsiloxane), the latter having a Young's modulus of about 2.5 MPa. The material chosen should more specifically not be brittle.

FIG. 4 is a graphic representing the variations of capillary pressures as experienced by a liquid propagating through the device 100. Capillary pressures are expressed in $N/m^2$. The various curves represent: a "closed" state of the valve (full line); an "open" state (dotted line) and an intermediate, partly deformed state (dashed line). Consistently with the embodiments of FIGS. 1-3, the closed/open states respectively correspond to non-deformed/deformed states. These curves all result from a theoretical model of a device 100, the latter depicted in the same drawing. The position of the liquid in the device is expressed in mm. This device 100 includes a loading pad 60 (region R1) for loading liquid into the device, a loading channel (region R2), for bringing liquid to a narrowing channel (region R3), which in turn leads to a first microchannel (region R4). Then, the flowpath abruptly enlarges when entering the chamber of the valve 50 (region R5), until it reaches a maximal width (i.e., its characteristic x-dimension);

Next, the flowpath width continuously decreases with an approximately constant slope (region R6), until it reaches a next section (53') of the valve's chamber, where the flowpath width still decreases but now with a smaller slope (region R7). Such a section provides a useful intermediate profile between region R6 and the next region R7, the latter corresponding to the output microchannel (region R8).

In this model, the cover (i.e., layer 20 in FIG. 3B) is made of a flexible material, e.g., Sylgard 184™. The microfluidic chip (i.e., layer 10 in FIGS. 3A and 3B) is microfabricated in silicon and has a native oxide treated to have an advancing contact angle with water of 45°. The cover may have an advancing contact angle with water of about 110°. As seen from the curves, the capillary pressure experienced by the liquid (typically water) typically drops with narrowing sections. It will be noted that capillary pressure would reach values close to zero for cavities having extended dimensions (depth and width), and should even (theoretically) reach zero for infinite depth and width. The capillary pressure typically reaches a minimum at the level of the microchannels (regions R4 and R8). In regions R5-R7, the capillary pressure suddenly increases, because of the abrupt enlargement of the valve's chamber. In the closed state (non-deformed, full line), capillary pressure reaches a level (typically >-1 000 N/m$^2$) that is similar to (i.e., has a same order of magnitude of) that in the loading pad (region R1), higher than in the loading channel (region R2), and substantially higher than in the input microchannel (region R4). As a result, liquid essentially stops at the input port. Typically, the PDMS cover (layer 20) lies 60 μm above layer surface 58, when not deformed.

Next, opening the valve (i.e., deforming it in direction -y), allows for subsequent deformation states where capillary pressure substantially decreases (dashed and doted lines). In the "open" state, the PDMS layer 20 is typically pressed down to 20 μm (on average) above the lower layer 10, which corresponds to a stretch ratio of $\lambda=1/3$. Thus, an order of magnitude of the deformation within the hollow chamber (and along the deformation axis) is typically $e=\lambda-1=-2/3$. In fact, a suitable stretch ratio is one that allows the chamber to pass from a state that is clearly capillary inactive to a state that is clearly capillary active, with respect to the liquid considered. Typical stretch ratios would thus more generally be comprised between 0.1 and 0.75, and possibly between 0.1 and 0.5, as exemplified above.

As seen, the differences of capillary pressures between the maxima in the closed and open states can be as high as 2000 N/m$^2$, and typically more than 1000 N/m$^2$. Since the lowered capillary pressure is now below the capillary pressure as experienced in regions R1-R2, the liquids, seeking to lower their potential energy, are pulled through the valve to reach region R8.

Incidentally, it is noted that, irrespective of the exact configuration of the device 100 (whether it comprises a loading pad, a loading channel, etc., or not) and the exact values of capillary pressures experienced by liquid propagating through the device, as long as distinct deformation states can be defined for the valve (with deformation intersecting axis z), liquid shall necessarily be pulled along the flow direction more in one of theses states than in the other. The modification of the geometry along the deformation axis results in that capillary effects are more effective in one state than in the other. Accordingly, and referring back to FIGS. 1 through 3, a core idea of the present disclosure is to provide a valve with a hollow chamber 53, which enlarges the flowpath and is deformable along a direction intersecting the flow direction. A valve mechanism is accordingly obtained, which allows for controlling a flow of liquid along a flowpath.

In exemplary embodiments, the chamber is provided with additional geometrical features to make the valve more effective, e.g., to achieve an effective "stop-valve", rather than a means merely impacting the liquid flow dynamics. In this regard, it can be realized that a bulb design such as represented in FIG. 5A, where the flowpath is seen to enlarge at the level of the input port, results in slowing down the liquid at the input port rather than stopping it clearly (i.e., before deforming the chamber). Of course, the actual behavior of the liquid shall depend on the precise geometrical features of the chamber, the nature of the liquid, the chemical surface state of the flowpath, etc., as the earlier.

Now, it can be realized that the entrance opening angle $\theta_{add}$ of the chamber 53, i.e., at the level of the input port 51, impacts the propensity of the liquid to wet the flowpath at the input port and, thus, the flow dynamics. Therefore, embodiments of the present invention provide an entrance opening angle $\theta_{add}$ that is "negative". More precisely, if this entrance angle $\theta_{add}$ is measured between the flow direction z and the portion of the valve that delimitates the chamber at the input port 51, then this angle is set between 90° and 180°, see, e.g., FIG. 6B, which zooms on the input port region of FIG. 6A. More specifically, this angle is comprised between 110° and 160°, a suitable value being typically 135°. Thus, considering a situation where liquid fills a microchannel with an advancing contact angle $\theta_{adv}$, the enlargement, i.e., the widening at the entrance in the chamber adds an angle component $\theta_{add}$ that challenges the propagation of the meniscus into the chamber of the valve. This increases the stability of the valve in its blocking state.

Similarly, the output geometry also impacts the flow dynamics. It has been found that the angle $\theta_{out}$, i.e., at the level of the output port, should be less than the opening angle $\theta_{add}$. Note that the angle $\theta_{out}$ is this time measured between direction -z (i.e., opposite to the flow direction z) and the portion of the valve delimiting the chamber at the output port. Thus, $\theta_{out}$ is between 0° and 90°. More specifically, it is set between 20° and 70°, a typical, suitable value being bout 35°.

As a result of the preferred angle values and x-enlargement, the profile of the valve along the flow direction is essentially tear-shaped, as illustrated in the examples shown in FIGS. 5-9. More generally, the geometry of the inlet can be optimized in various ways, so as to pin the liquid at the entrance of the valve and prevent it from creeping along corners and sidewalls. This is especially true when the walls of the valve are hydrophilic, or when the liquid has surfactants or has a lower surface tension. As indicated above, optimization can be performed in respect of opening angles $\theta_{add}$ and $\theta_{out}$.

Other geometrical parameters shall impact the valve efficiency. Notably, it was found that minimal length/width ratios of the inner chamber 53 should be between 3/1 and 1/1, as depicted in FIGS. 5A-5C, where this ratio passes from approximately 1/1 to 3/1. Note that, here, the "inner chamber"

represent the chamber 53, yet excluding the intermediate section 53' leading to the output channel, as denoted by dashed lines FIG. 5.A. The higher the minimal length/width ratio, the more progressive the profile toward the output channel, which allows for reducing dead volume and risk of air entrapment. Incidentally, the width of the chamber is typically 200-1800 µm, more specifically about 600 µm. In the above examples, the length and width are measured along directions z and x, respectively. More generally, the characteristic width of the chamber is measured in a plane (x, z), perpendicular to the deformation direction.

Thus, as described above in reference to FIGS. 1-6, three important parameters of the valve are its depth (y-axis), its width (or, say, its characteristic lateral dimension along x-axis) and length (z-axis). Of course, the actual number of such parameters depends on the symmetry given to the chamber. The width and depth for instance reduce to one (radial) parameter if the chamber is constrained to have cylindrical symmetry. Similarly, only one radial parameter results from spherical symmetry. Now, such parameters (i.e., the depth and width in FIGS. 1-6) combine with the Young's modulus of the deformable wall (i.e., the cover) to define the critical actuation pressure. This pressure is what needs to be applied on the cover where the valve is located to trigger a flow from the inlet to the outlet. As described earlier, since it is easier and more economical to produce microfluidic chips wherein structures have all the same depth, it is particularly convenient to vary the width rather than the depth to set the critical pressure. Typically, the characteristic lateral dimension corresponds to the maximum width of the valve. For modeling purposes, it is also possible to approximate a section of the valve to a circle, in which case the characteristic lateral dimension becomes the diameter of the valve. The cover is typically made from poly(dimethylsiloxane) (or PDMS) such as Sylgard 184™, which has a Young's modulus of ~2.5 MPa.

Next, the propagation of thin liquid films along corners and surfaces can be hard to prevent, especially when a valve is desired to block a liquid for a long time and/or if there are temperature and pressure changes. A further reduction of liquid creeping can be achieved by creating indentations (protrusions or teeth 72, 74) along sidewalls 54, 56 of the valve, as depicted in FIGS. 7A-7C, 8A, 8B, and 9C, 9D. Such indentations 72, 74 protrude outwardly, i.e., they have a main component on the x-direction. Indented paths increase the peripheral surface offered to the liquid, typically by a factor 4/3 (FIGS. 7A, 7B). Indentations near the outlet (FIGS. 7A, 7B, 8A, 8B, 9C, and 9D) are particularly useful because they enable trapping and slowing down small droplets of condensing liquid. In FIG. 7C, the path is indented on most of the valve periphery. In FIGS. 8B, 9C, and 9D, tapered indentations are provided, such as to provide entrance angle with high value "added" angles. More generally, the shapes of indentation can be optimized concurrently with opening angles $\theta_{add}$ and/or $\theta_{out}$, as illustrated in FIG. 8A.

Next, the valve 50 may further comprise wettable pillars 86 (or pinning structures, represented as white dots in FIGS. 9 and 10). Such pillars typically extend from the lower wall 10, 58 to the upper wall 20 of the valve 50. The pillars distribution is substantially denser at the level of one of the ports (i.e., the input port), or even each of the ports (input and output ports), than at the center of the valve.

Pinning structures can help to stop a liquid filling front in a wettable channel at a precise location, if needed. An example is a line or rectangular posts with narrow spacing, forming a channel. When the liquid filling the structure reaches the outlet of a narrow channel, the advancing liquid meniscus is challenged by the surface tension of the liquid. The energetically most favorable state is reached when the liquid meniscus bows out of the channel with a radius of curvature of half the channel width. Referring more specifically to FIG. 9A, rectangular posts are provided at the entrance (input port). Rectangular posts in a semi-circle distribute the liquid to many pinning channels. Post dimensions are typically 40×40 µm² with a spacing of 20 µm. In FIG. 9B, circular posts distribute the liquid to one single line of pinning rectangular posts (pinning line). The diameter of the circular posts is e.g., 70 µm;

Referring to FIG. 9C, structures are provided to distribute and pin the liquid filling front. It combines with indented walls (with added angles) to stop creeping of liquid along the corners. In FIG. 9D, rectangular posts distribute the liquid to a pinning line. Corrugated walls and indented walls with added angles can be added to stop creeping of liquid at channel walls, if needed. In addition, the microfluidic device 100 may further comprises one or more reservoirs 90, 92 connecting the hollow chamber 53, e.g., through respective ports as depicted in FIGS. 10A-C.

Added angles, pining structures and reservoirs are as many optional features which can be combined for optimizing a device according to embodiments. For example, in FIGS. 10A and B, sidewalls of the valve are placed away from the central area of the chamber by creating side reservoirs 90, 92. In FIGS. 10A and 10B, pinning the liquid filling front using pillars, added angles, and side cavities decreases further creeping of liquid along walls of the valve. Building on this principle, the flow of liquid can even be constrained to a narrow incoming path toward the valve area using (wettable) pillars, FIG. 10C. In this limit case, the valve was found to be particularly stable. In further detail, the flowpath depends on pillar structures, as the flow path of the liquid filling the chip is defined by the pillars, e.g., circular posts 86 (typical diameter and spacing being ~100 µm). Liquid enters the structure from the left and fills the volume between the posts with liquid. In the center of the stop valve, where pillars are absent, the capillary pressure approaches zero: the liquid cannot proceed any further and filling is stopped. To have the liquid pass the other side, the chamber 53 is deformed, as described earlier.

Next, a microfluidic device according to embodiments may further comprises a number of additional features, such as a loading pad 60 (FIGS. 4, 11, 12), i.e., upstream the first microchannel, to load liquid into the device, a reaction chamber 70 downstream the valve 50 (FIG. 11), a reagent zone 82 (FIG. 11), e.g., inserted between the loading pad and the first microchannel, and a capillary pump (84), inserted downstream the valve 50, more specifically after the reaction chamber 70, etc.

FIG. 11 shows a design of a microfluidic chip having a loading pad able to receive 2 µL of liquid, a reagent zone 82, a mechanical stop valve 50, a reaction chamber 70 and a capillary pump 84 as described above. This design can for instance be transferred into silicon using reactive ion etching (typical depth of channels in the silicon chip: 60 µm). A PDMS cover is placed on top (not shown) to cover the channels and pumps. In the area of the reaction chamber, the PDMS cover comprises lines of biological receptor molecules (e.g., avidin or other biomolecules), which cross the reaction chambers perpendicularly and are facing the lumen of the reaction chamber. In this chip, an assay can be done in the reaction chamber located after the valve and before the capillary pump.

It should be noted, however, that present embodiments are not at all limited to applications with biological receptor molecules or, even, receptor molecules. One may for instance want to use a microfluidic chip for testing metabolites that are not biological although present in the human body (like citrate or other metabolites). Also, keeping the previous example of metabolites, detection could for example be performed by using an enzymatic reaction and not a ligand-receptor binding. A skilled person may appreciate that various other applications can be contemplated with microfluidic devices as provided herein.

More generally, peripherals for experiments using chips having the valves disclosed herein may include: a heating stage underneath the reagent zone (as some assays require labeling analytes using various temperatures or dissociating analyte molecules); a cooling stage underneath the loading pad (for example to limit evaporation, especially if very small volumes of sample are used or enhance the stability of reagents/analytes); a fluorescence reader, e.g., above the reaction chamber (to read signal of the assay through the cover) or under the reaction chamber in the case of a plastic chip; a piston (e.g. a solenoid that can be programmed to exert a precise pressure at a given time onto the valve); and a pipetting robot (for automatic loading of samples and reagents onto the loading pad and/or reagent zone. Such peripherals are, however, not requirements for a valve mechanism as described herein.

Next, some of the concepts described above may be parallelized. For example, a microfluidic device may, in embodiments, comprise n sets, n≥2, each comprising first and second microchannels and a valve configured as described above.

For example, a microfluidic chip with nine channels for parallel detection of analytes is disclosed in FIG. 12. The dimensions of the chip are approximately 52×47 mm$^2$. Flow direction on the chip is left to right. The chip comprises a common loading pad onto which 10 µL, of sample can be pipetted. A system of channels pulls the liquid from the pad and distributes it equally into nine distinct flow paths. All paths are typically made equal (in length and therefore hydraulic resistance) using serpentines. Each flow path leads to a reagent zone which can hold a liquid volume of 0.5 µL. Each reagent zone is followed by a microchannel that comprises a mechanical stop valve 50 to interrupt the filling of the chip with liquid. Each valve is followed by a reaction chamber. The nine reaction chambers are kept proximal and parallel to ease the reading of signals using optical systems. Each reaction chamber is connected to a capillary pump that can hold a liquid volume of 1 µL.

Microfluidic devices such as described above can notably be applied to biological assays. For instance, FIGS. 13A-13D reflect time sequence fluorescence microscope images showing molecular grade water containing biotinylated 997 bp dsDNA PCR product with Bryt™ Green dye (fluorescent when it is intercalated in double strand DNA), passing the valve (from left to right). Taking as an example the detection of PCR products composed of nucleotides (double-stranded DNA, each having 997 bases), an assay for detecting this PCR product in a sample utilizing the valve and chip shown in FIG. 11 was done. First, 1 µL, of Bryt™ Green dye and 1 µL of 2 µM biotinylated 20 bases single-stranded DNA probe were pipetted in a reagent zone 82 of a chip (without having the cover in place) and dried. Second, 1 µL of sample containing 10 nM 997 bp PCR product in Tris-EDTA buffer solution was pipetted in a loading pad 60. The liquid meniscus filled a hybridization chamber 81, a first microchannel 31, and stopped at the input port 51.

The filling of the sample from the loading pad until the input port approximately took 30 seconds and when the sample reached the reagent zone, it dissolved the Bryt™ Green dye and biotinylated 20 bases single-stranded DNA probe. Third, the area of the reagent zone of the chip was heated to 95° C. and cooled down to room temperature. The heating of liquid in the reagent zone sometimes resulted in the formation of an air bubble in the reagent zone. It was found possible to remove it by applying a pressure (approximately 1 bar above ambient pressure) using a custom-made pressurization chamber. During the heating step, the double strand PCR product melted (the strands separated) and the biotinylated single-stranded DNA bound its complementary sequence in the PCR product during cooling. This process typically took around 10 min during which the valve 50 was stopping the liquid. Fourth, by pressing a push nod 110 on top of the PDMS above the cavity 53 (e.g. using the tip of a pencil) the PDMS was deformed into the channel and the liquid was pulled into the cavity. Fifth, the liquid then passed through the second microchannel 32, through the reaction chamber 70, and reached the capillary pump 84. In the reaction chamber 70, the biotinylated probes annealed to PCR products were captured on avidin receptors patterned on the PDMS surface facing the lumen of the reaction chamber. The captured PCR product analytes were quantified by means of surface fluorescence using a fluorescence microscope.

Applications are however not limited to biological assays. The types of reagent, liquid compositions, temperatures and incubation time can be varied. Many types of samples with analytes to be detected can be added to the loading pad and many different types of reagents (chemicals, dyes, enzymes, oligonucleotides, antibodies, etc.) can be added in the reagent zone. The volumes, type of microstructures in the chip, size of the chip, materials used for the chip and cover can be varied. The geometry of the valve can be varied to adjust for different mechanical properties of the cover. The valves and microfluidic chip can be used under ambient conditions as well as within a pressurized chamber.

According to a first aspect, the present invention is embodied as a microfluidic device comprising: a first microchannel, a second microchannel, and a valve comprising at least an input port and an output port, the ports respectively connected to the first microchannel and the second microchannel, the valve designed to control a flow of a liquid along a flow direction defined by the ports, wherein, the valve further comprises one or more walls joining the ports and defining a hollow chamber that is wider than each of the microchannels in a direction perpendicular to the flow direction, the walls at least partly deformable along a deformation direction intersecting the flow direction, such that the walls can be given at least a first deformation state and a second deformation state, such that the liquid can be pulled along the flow direction substantially more in the second deformation state than in the first deformation state.

In other embodiments, the microfluidic device may comprise one or more of the following features: the first deformation state and the second deformation state respectively induce a first capillary pressure and a second capillary pressure for the liquid, the first capillary pressure being substantially larger than the second capillary pressure, typically by more than 1000 N/m$^2$, and the first capillary pressure having a same order of magnitude as a capillary pressure induced in a portion upstream the first microchannel, the upstream portion corresponding to a portion comprising a loading pad for loading liquid into the device; the first deformation state is essentially a non-deformed state and the second state is essentially a deformed state, and an average dimension of the hollow chamber along the deformation direction exhibits a ratio between the second deformation state and the first deformation state, which is between 0.1 and 0.9, more specifically between 0.5 and 0.75, and the walls at least partly deformable are non-permanently deformable, and more specifically resiliently deformable; a characteristic dimension of the hollow chamber is substantially larger than a characteristic dimension of each of the first and the second microchannels, wherein the characteristic dimensions are measured in a same plane, perpendicular to the deformation direction, and more specifically measured in a direction perpendicular to both the deformation direction and the flow direction; depths of each of the microchannels and the hollow chamber, as measured along the deformation direction, are essentially equal; at least portions of each of the first microchannel and the second microchannel at the level of the ports are grooves open on an upper surface of a first layer, and the hollow chamber is defined by a depression open on the upper surface of the first layer, the grooves and the depression being closed by a lower surface of a second layer, and the first layer and/or the second layer are at least partly deformable and exhibit a tensile strength between 1 and 60 Mpa, and more specifically between 20 and 60 Mpa; an opening angle $\theta_{add}$ of the chamber at the level of the input port, as measured between a flow direction and a portion of the one or more walls delimiting the hollow chamber at the input port, is between 90° and 180°, more specifically between 110° and 160°, and even more specifically substantially equal to 135°; an opening angle $\theta_{out}$ of the chamber at the level of the output port, as measured between a direction opposite to the flow direction and a portion of the one or more walls delimiting the hollow chamber at the output port, is between 0° and 90°, more specifically between 20° and 70°, and even more specifically substantially equal to 35°, and the profile of the valve along the flow direction is essentially tear-shaped.

In addition, a minimal length/width ratio of the hollow chamber is between 3/1 and 1/1, the length measured along the flow direction and the width measured perpendicularly to both the length and the deformation direction; the valve comprises sidewalls at least partly indented, the indented sidewalls exhibiting protrusions protruding outwardly; the valve further comprises wettable pillars extending from a lower wall to an upper wall of the valve, the pillars distribution being substantially denser at the level of one of the ports or each of the ports than at the center of the valve; the microfluidic device further comprises one or more reservoirs connecting the hollow chamber; and the microfluidic device further comprises a loading pad upstream the first microchannel, and comprises a reaction chamber downstream the valve, and more specifically comprises reagent zone and a capillary pump, respectively inserted in a liquid path of the first microchannel and the second microchannel.

According to a further aspect, the invention is embodied as a microfluidic device, comprising n sets, n≥2, each of the sets comprising a first microchannel, a second microchannels and a valve configured similarly as the first microchannel, the second microchannel and the valve of the device according to any one of the above embodiments.

According to a final aspect, the invention is embodied as a method for controlling a liquid flow in a device according to any one of the above embodiments, comprising: filling the first microchannel with liquid; and deforming the one or more walls at least partly deformable such that liquid is pulled through the hollow chamber from the first microchannel to the second microchannel.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, present devices may be embodied with conduits inserted through each of the superimposed layers 10, 20 of FIGS. 3A and 3B, in opposite or same directions, and possibly connected through microchannels. Several designs of microchannels could be contemplated. Several superimposed layers similar to layers 10, 20 can be fabricated, with conduits inserted though two or more layers and microchannels grooved at several interfaces, such as to enable fluid communication between three or more layers, etc. Interface layers could still be provided between a pair of layers 10, 20, etc.

The invention claimed is:

1. A microfluidic device comprising:
a first microchannel having a capillary pressure related to a width of the first microchannel;
a second microchannel having a capillary pressure related to a width of the second microchannel;
a valve comprising at least an input port and an output port, the ports respectively connected to the first microchannel and the second microchannel, the valve designed to control a flow of a liquid along a flow direction (z) defined by the ports; and
one or more walls of the valve defining a hollow chamber, the one or more walls including side walls defining a width of the chamber that is wider than each of the microchannels in a direction perpendicular to the flow direction, the side walls intersecting the first microchannel at the input port at an obtuse opening angle $\theta_{add}$ measured between a flow direction and a portion of the side walls defining the hollow chamber at the input port, wherein a capillary pressure of the chamber is related to the width of the chamber and a speed of the liquid entering the chamber from the first microchannel is related to a difference between the capillary pressure of the chamber and the capillary pressure of the first microchannel, the one or more walls further including top and bottom walls at least partly deformable between a first deformation state and a second deformation state along a deformation direction (−y) intersecting the flow direction,
wherein in the first deformation state the top and bottom walls are separated by a first distance to provide a first capillary pressure in the chamber greater than the capillary pressure of the first microchannel and said first deformation state is configured to reduce a flow of liquid into the chamber from the first microchannel, and in the second deformation state the top and bottom walls are separated by a second distance less than the first distance to provide a second capillary pressure in the chamber that is less than the first capillary pressure, and wherein said second deformation state is configured to advance fluid from the input port to the output port along the flow direction.

2. The device of claim 1, wherein the first capillary pressure is substantially larger than the second capillary pressure, typically by more than 1000 N/m², and the first capillary pressure has a same order of magnitude as a capillary pressure induced in a loading pad for loading liquid into the device upstream of the first microchannel.

3. The device of claim 1, wherein:
the first deformation state is essentially a non-deformed state and the second state is essentially a deformed state; and wherein an average dimension of the hollow chamber along the deformation direction exhibits a ratio between the second deformation state and the first deformation state, which is between about 0.1 and 0.9.

4. The device of claim 3, wherein the ratio is between 0.5 and 0.75.

5. The device of claim 3, wherein the walls are non-permanently deformable.

6. The device of claim 3, wherein the walls are resiliently deformable.

7. The device of claim 1, wherein a characteristic dimension of the hollow chamber is substantially larger than a characteristic dimension of each of the first and the second microchannels, wherein the characteristic dimensions are measured in a same plane (x, z), perpendicular to the deformation direction.

8. The device of claim 7, wherein the characteristic dimensions are measured in a direction (x) perpendicular to both the deformation direction and the flow direction.

9. The device of claim 8, wherein depths of each of the microchannels and the hollow chamber, as measured along the deformation direction, are essentially equal.

10. The device of claim 1, wherein at least portions of each of the first microchannel and the second microchannel at the level of the ports are grooves open on an upper surface of a first layer, and the hollow chamber is defined by a depression open on the upper surface of the first layer, the grooves and the depression being closed by a lower surface of a second layer, and wherein at least one of the first layer and the second layer are at least partly deformable.

11. The device of claim 10, wherein at least one of the first layer and the second layer exhibit a tensile strength between 1 and 60 Mpa.

12. The device of claim 10, wherein at least one of the first layer and the second layer exhibit a tensile strength between 20 and 60 Mpa.

13. The device of claim 1, wherein $\theta_{add}$ is between 110° and 160°.

14. The device of claim 1, wherein $\theta_{add}$ is about 135°.

15. The device of claim 14, wherein an opening angle $\theta_{out}$ of the chamber at the level of the output port, as measured between a direction opposite to the flow direction and a portion of the one or more walls delimiting the hollow chamber at the output port, is between 0° and 90°.

16. The device of claim 15, wherein $\theta_{out}$ is between 20° and 70°.

17. The device of claim 15, wherein $\theta_{out}$ is about 35°.

18. The device of claim 15, wherein a profile of the valve along the flow direction is tear-shaped.

19. The device of claim 1, wherein a minimal length/width ratio of the hollow chamber is between 3/1 and 1/1, the length measured along the flow direction and the width measured perpendicularly to both the length and the deformation direction.

20. The device of claim 19, wherein the sidewalls are at least partly corrugated by indentations which protrude outwardly from the side walls.

21. The device of claim 1, wherein the valve further comprises wettable pillars extending from a lower wall to an upper wall of the valve, the pillars distribution being substantially denser at the level of one of the ports or more specifically each of the ports than at the center of the valve.

22. The device of claim 1, wherein the microfluidic device further comprises one or more reservoirs connecting to the side walls of the hollow chamber.

23. The device according to claim 1, wherein the microfluidic device further comprises a loading pad upstream the first microchannel.

24. The device according to claim 23, further comprising a reaction chamber downstream the valve, the reaction chamber comprising reagent zone and a capillary pump, respectively inserted in a liquid path of the first microchannel and the second microchannel.

25. A microfluidic device, comprising:
a plurality of sets, each of the sets comprising: a first microchannel having a capillary pressure related to a width of the first microchannel;
a second microchannel having a capillary pressure related to a width of the second microchannel;
a valve comprising at least an input port and an output port, the ports respectively connected to the first microchannel and the second microchannel, the valve designed to control a flow of a liquid along a flow direction (z) defined by the ports; and
one or more walls of the valve defining a hollow chamber, the one or more walls including side walls defining a width of the chamber that is wider than each of the microchannels in a direction perpendicular to the flow direction, the side walls intersecting the first microchannel at the input port at an obtuse opening angle $\theta_{add}$ measured between a flow direction and a portion of the side walls defining the hollow chamber at the input port, wherein a capillary pressure of the chamber is related to the width of the chamber and a speed of the liquid entering the chamber from the first microchannel is related to a difference between the capillary pressure of the chamber and the capillary pressure of the first microchannel, the one or more walls further including top and bottom walls at least partly deformable between a first deformation state and a second deformation state along a deformation direction (−y) intersecting the flow direction,
wherein in the first deformation state the top and bottom walls are separated by a first distance to provide a first capillary pressure in the chamber greater than the capillary pressure of the first microchannel and said first deformation state is configured to reduce a flow of liquid into the chamber from the first microchannel, and in the second deformation state the top and bottom walls are separated by a second distance less than the first distance to provide a second capillary pressure in the chamber that is less than the first capillary pressure, and wherein said second deformation state is configured to advance fluid from the input port to the output port along the flow direction.

* * * * *